United States Patent Office 3,079,585
Patented Feb. 26, 1963

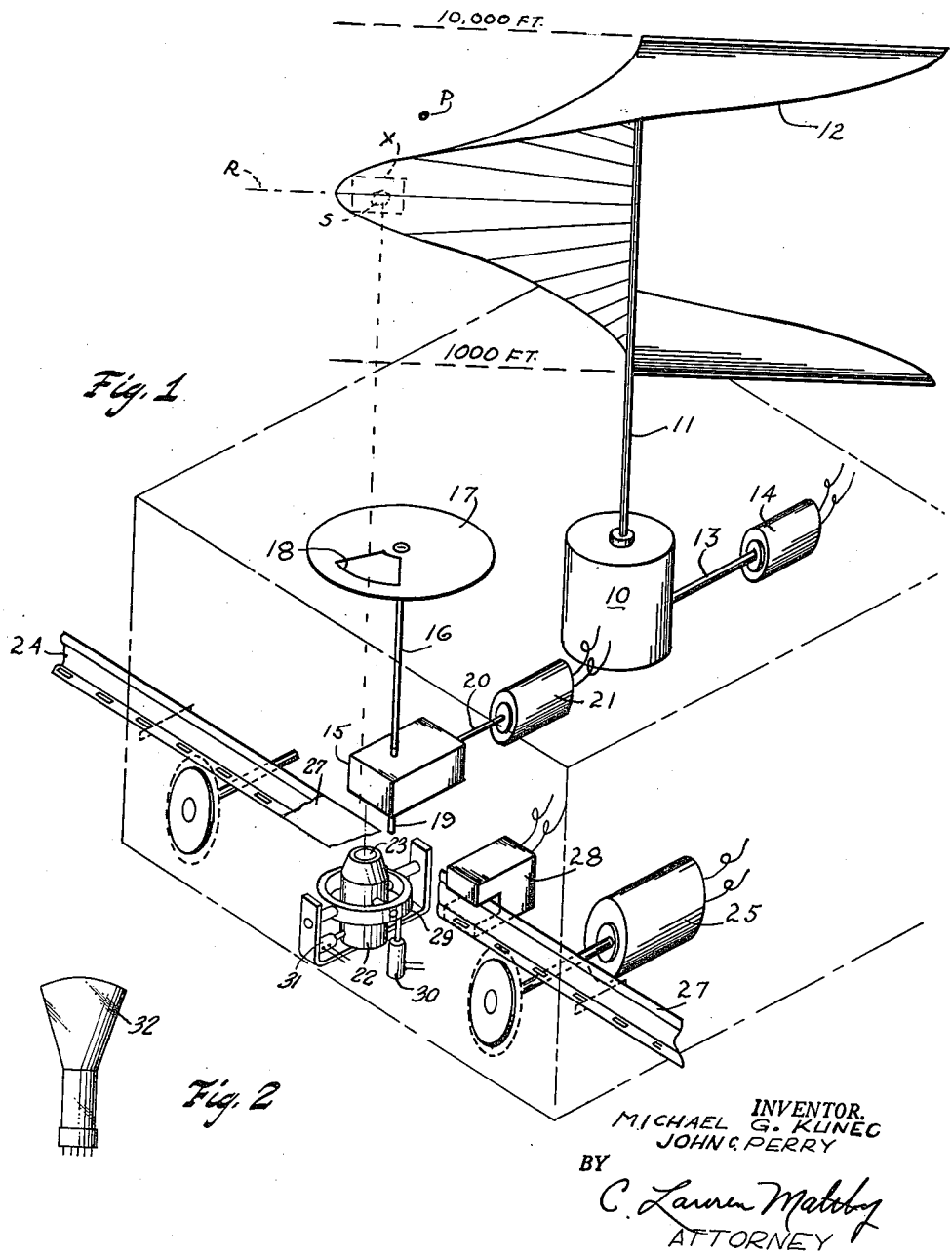

3,079,585
THREE-DIMENSIONAL DISPLAY SYSTEM
John C. Perry, 7107 Coldwater Canyon Ave., North Hollywood, Calif., and Michael G. Kunec, 4957 Hollywood Blvd., Hollywood 27, Calif.
Filed Feb. 6, 1961, Ser. No. 87,381
6 Claims. (Cl. 340—23)

This invention relates to displays and more especially to a three-dimensional display system.

The general object of the invention is to provide a novel three-dimensional display system capable of being actuated or activated from a plurality of remote points.

More specific objects and advantages of this invention will be brought out more fully in the following specification, reference being had to the accompanying drawing wherein:

FIGURE 1 is a somewhat diagrammatic perspective view of an embodiment of the invention.

FIGURE 2 is a view of a cathode-ray tube optical system.

The base 10 provides a bearing mounting for a vertically rotating shaft 11 which carries a screen 12. This screen is in the form of a one-turn or 360 degree helix, preferably composed of a transparent medium such as a methyl acrylic coated on one side with an ultra violet sensitive phosphor such as zinc sulphide. Shaft 11 is connected by gearing to a transverse shaft 13 driven by a synchronous motor 14.

A base 15 mounts a vertical shaft 16 carrying a shutter 17 having an aperture 18. Shaft 16 is connected through a differential mechanism to a drive shaft 19 connected to a synchronous drive motor. The differential mechanism includes a control shaft 20 connected to a servo motor or mechanism 21. An optical projector comprising a lamp 22 and suitable lenses 23 are mounted below shutter 17 in such manner that the light projected from the projector will pass through aperture 18 of the shutter to an area indicated by the notation "X" on the screen 12. A film or tape 24 is suitably mounted for drive by synchronous motor 25 and moves in a manner to pass through the light beam of the projector. This film has a plurality of frames 26 formed with apertures which permit the ultra violet light from lamp 22 to pass through to the screen 12. The film 24 also has a control band or track 27 for actuating a sensor device 28 for controlling servo motor 21. This control track and sensor unit may be optical, magnetic, mechanical, or the equivalent.

Motors 14 and 25, together with the drive motor of shaft 19 will be interconnected for a synchronous operation such that screen 12 and shutter 17 will rotate at the same speed. The drive of motor 25 will be such that film frames 26 will be at the projector axis at substantially the same time as aperture 18. The apertures of film frames 26 will be formed by the operation of known forms of data or information transmitting apparatus of the computer type, and each frame may represent information or data supplied from one or more remotely positioned points and transmitted to the display system electrically or electronically. This display information may be alpha numeric, diagrammatic, or other forms of intelligence.

An example of one use of the display system is for the control of airplanes approaching an airport. Assuming that planes in the vicinity of the airport would operate between 1,000 and 10,000 feet, the servo mechanism would control the phase relation of shutter 17 with screen 12 by the actuation of servo motor 21 from sensor 28 in such manner that aperture 18 when crossing the projector axis, would permit the projected light to strike screen 12 at the instant the portion of the screen along the radius "R" would be crossing the optical axis. Assuming a certain plane were being observed by a radar detection unit at a particular point in the area covered by the system, its position and movement could be transmitted to the tape 24, and the height of the plane, such as at 5,000 feet altitude, could be transmitted to control track 27 which will actuate the servo motor 27 and shutter 17 so that a spot on the screen indicated at "S" would appear at the 5,000 foot level on the screen 12. The screen and shutter will operate a high speed and therefore the intelligence displayed will appear without the viewer actually seeing the screen. The altitude of a second airplane, appearing say at a point "P," could be detected and transmitted to the display mechanism simultaneously from another radar detection unit, and these detection units could follow the movement of the planes in a horizontal direction. Thus the screen 12 could visually and instantly "see" the several planes in the airport control area, and the relative movements in this control area would be portrayed for use by an airport controller.

The invention is not limited to displays of the type shown and described herein but is adaptable to a wide variety of three-dimensional displays. The optical system is shown as gimbal mounted at 29 for rotation about two axes that intersect the optical axis and the gimbal mountings rotated by servo control means 30 and 31 such that the spot "S" can be moved in two directions and thus follow the movement of an object such as an airplane. Also, two or more separate optical systems may be used jointly and the respective observed objects directed toward the screen 12, as should be clear. The screen 12 is a helical surface which involutes about its axis shaft 11, and is so constructed that any line drawn from said axis out to the periphery of the helical surface will be perpendicular to the axis of rotation.

FIGURE 2 shows an alternate optical projector system comprising a cathode-ray tube 32.

Having described our invention what we claim is:

1. A three-dimensional display comprising a screen mounted for rotation about an axis and comprising a one-turn helix, the plane of said helix having successive line elements at right angles to said axis, means to rotate said screen at constant speed, an optical projector directed toward said screen including a shutter having a drive synchronized with said screen rotation and servo-means to alter the phase relation of the shutter and screen rotation, a film bearing programmable matter movable across the optical axis of said projector, and a servo-control sensor adjacent said film, said film having means for activating said sensor to actuate said servo-means and alter said shutter and screen rotational phase relation.

2. Apparatus according to claim 1 wherein said screen is transparent and coated on one side with an ultra violet sensitive phosphor.

3. Apparatus according to claim 1 wherein said screen is transparent and coated on one side with an ultra violet sensitive zinc sulphide phosphor.

4. Apparatus according to claim 1 wherein said optical projector is gimbal mounted for rotation about two axes that intersect the optical axis.

5. Structure according to claim 1 wherein said axis is substantially vertical and said projector is directed upwardly.

6. Structure according to claim 1 wherein said projector is a cathode ray tube.

No references cited.